United States Patent [19]
Tominaga et al.

[11] 3,858,422
[45] Jan. 7, 1975

[54] JET MOLDING DEVICE

[75] Inventors: Hiroshi Tominaga; Masanobu Takamatsu, Yokohama; Kohei Adachi, Chigasaki, all of Japan

[73] Assignee: Tokyu Sharyo Seizo Kabushiki Kaisha, Kanagawa-ken, Japan

[22] Filed: Aug. 17, 1973

[21] Appl. No.: 389,080

[52] U.S. Cl............................. 72/56, 72/62, 29/421, 425/387 R
[51] Int. Cl............................................. B21d 26/06
[58] Field of Search............ 72/56, 61, 62; 29/421 E

[56] References Cited
UNITED STATES PATENTS

| | | |
|---|---|---|
| 3,252,312 | 5/1966 | Maier........................................ 72/56 |
| 3,438,125 | 4/1969 | Larsen et al............................ 72/56 |
| 3,555,866 | 1/1971 | Roth........................................ 72/56 |
| 3,557,590 | 1/1971 | Erlandsun................................ 72/56 |
| 3,566,647 | 3/1971 | Inoue...................................... 72/56 |
| 3,575,025 | 4/1971 | Tominaga et al..................... 29/421 |
| 3,654,788 | 4/1972 | Kimura................................. 29/421 |

*Primary Examiner*—Richard J. Herbst
*Attorney, Agent, or Firm*—Blum, Moscovitz, Friedman & Kaplan

[57] ABSTRACT

An improved molding device for jet-forming a workpiece which includes laterally adjustable die segments, a displaceable tapered jet spray guide member, a jet spray nozzle for introducing a jet stream into the mold cavity and means for pressurizing a liquid introduced into the mold cavity through the jet nozzle.

5 Claims, 4 Drawing Figures

JET MOLDING DEVICE

BACKGROUND OF THE INVENTION

This invention relates to an improved molding device for jet-forming a workpiece into a desired configuration in the ambience and more particularly to an impact molding device employing a pressure jet for impact molding a workpiece.

Prior impact liquid pressure molding devices have been of the sealed water pressure system type wherein the workpiece to be formed is positioned in the mold, water-filled and then formed under pressure by applying an impact force on the water for providing internal pressure for thereby configuring the workpiece. In systems of this prior type, large quantities of liquid, for instance water, must be employed during each phase of the forming operation and the water employed must be degassed for evacuating air bubbles therefrom. These prior devices are therefore costly to operate and unsatisfactory where water is in short supply. Because these prior devices are self-contained closed systems, they are of limited versatility. Moreover these forming cycles take at least about 12 to 15 seconds with concomitant unsatisfactory efficiency.

Accordingly, the instant invention provides a molding device for jet-forming a workpiece which is efficient, economical, versatile and employs limited quantities of water or other forming liquids.

SUMMARY OF THE INVENTION

Generally speaking, in accordance with the invention, an improved molding device for jet-forming a workpiece is provided which includes a mold having a workpiece forming cavity, means introduceable into the workpiece forming cavity for deflecting a jet stream against a workpiece for thereby deforming the workpiece to the contour of the workpiece forming cavity, and means communicating with the workpiece forming cavity for introducing a jet stream therein for deforming the workpiece. Preferably, the deflecting means and jet stream introducing means are coaxially arranged.

The mold may include a plurality of discrete die segments radially adjustable about a common axis and may be provided with actuable means for making the suitable radial adjustments thereto. The deflecting means includes an axially displaceable tapered jet spray guide member which may be, and preferably is, coaxially arranged with the discrete die segments of the mold and the member is positionable within the mold for sealing an end thereof. Other means may be provided for sealing the other end of the mold, and for instance the mold may be mounted on a base for sealing the other end thereof. The member may be provided with actuable means for the suitable axial displacement thereof.

In a preferred embodiment of the device the tapered jet spray guide member may include a flange portion for sealing the end of the mold, an expanded diameter portion connected to the flange portion for positioning the workpiece in the workpiece forming cavity of the mold, an extended, diametrically contracted portion connected to the expanded diameter portion which is spaced from the workpiece to form a liquid jet passage therebetween, and an end portion connected to the extended, diametrically contracted portion provided with an end point and taper for parting the liquid jet introduced into the workpiece forming cavity through a jet port. The jet stream introducing means may include a jet port provided in the base on which the mold is mounted which communicates with the workpiece forming cavity thereof, a liquid passage communicating with the jet port and means for applying an impact pressure on liquid which may be introduced into the liquid passage.

In one embodiment of the device, a spring biased bore member may be mounted in a recess on the forming surface of a discrete die segment for boring or creasing a configured workpiece. The workpiece may be configured, bored or creased in the same operation.

While any conventional forming liquid may be jet sprayed into the workpiece forming cavity of the mold for deforming the workpiece to the mold contour, it is recognized that water will be the liquid most commonly employed. It is an advantage of the device that the water employed need not be degassed prior to use. It is another advantage of the device that the workpiece forming cavity need not be evacuated prior to a forming operation. A further advantage of the device is the short forming cycle, 2 to 3 seconds, concomitant with its operation. It is yet a further advantage of the device that it employs a minimum quantity of water during the forming operation.

Still other objects and advantages of the invention will in part be obvious and will in part be apparent from the specification.

The invention accordingly comprises the features of construction, combinations of elements, and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
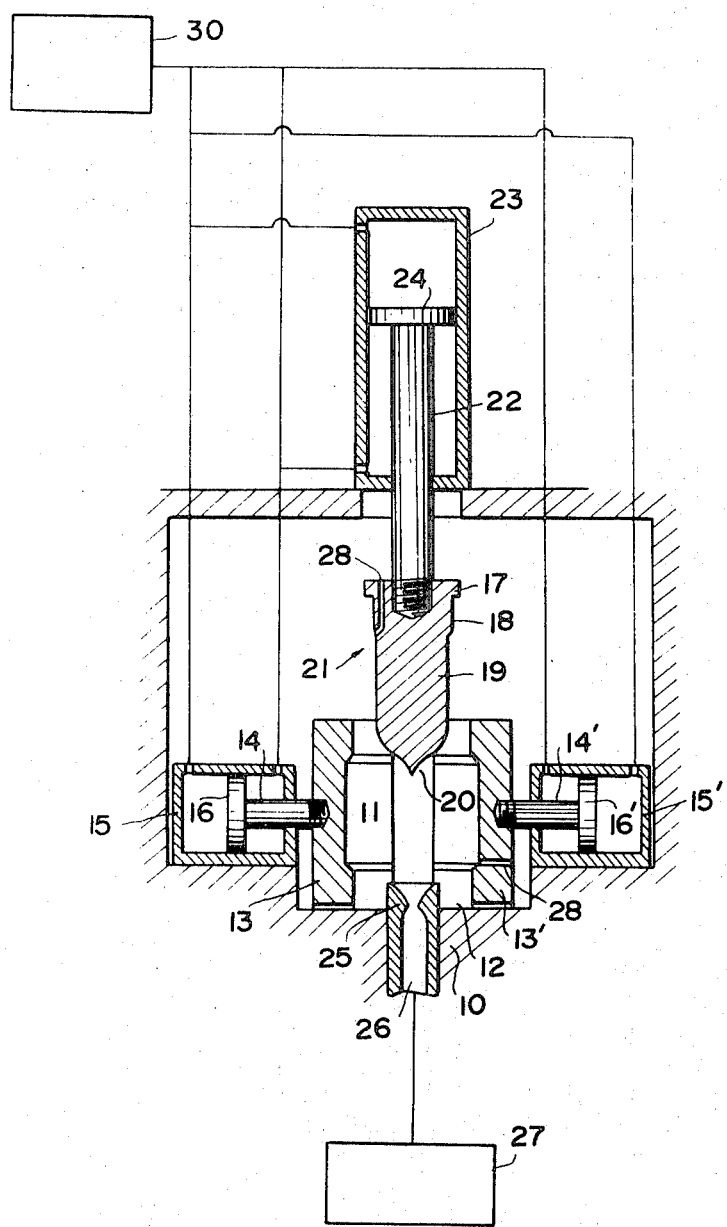
FIG. 1 is a sectional side elevational view of a molding device embodiment constructed in accordance with the invention.

Referring now to the drawings where there is shown a mold 12 having a cylindrical workpiece forming cavity 11 mounted on a base 10. Mold 12 comprises radially adjustable die segments 13 and 13'. By their exterior sidewalls, respective die segments 13 and 13' are connected through piston rods 14, 14' to pistons 16, 16' of air cylinders 15, 15', respectively, for radially adjusting the volume of cavity 11 and for opening mold 12 for positioning therein a workpiece or for removing from mold 12 a workpiece configured to the contour of cavity 11.

Axially aligned with mold 12 is a tapered jet spray guide member 21 which includes a flange portion 17 for sealing the top end of mold 12, an expanded diameter portion 18 connected to flange portion 17 for positioning a workpiece 9 correctly within cavity 11, an extended diametrically contracted portion 19 connected to expanded diameter portion 18 which is spaced from workpiece 9 to form a liquid jet passage therebetween, and an end portion 20 connected to extended, diametrically contracted portion 19 which is provided with an end point and taper for parting a liquid jet introduced into the workpiece forming cavity 11 through a jet port 25. Exteriorly mounted on flange portion 17 of tapered jet spray guide member 21 is a piston rod 22 connected at one end thereof to a piston 24 of an air cylinder 23 for axially lifting tapered jet spray guide member 21 out of or axially lowering tapered jet spray guide member 21 into workpiece forming cavity 11 of mold 12.

In base 10, there is provided a jet port 25 aligned with tapered jet spray guide member 21 having a configuration substantially conforming to the tapered end portion 20 of tapered jet spray guide member 21. Jet port 25 is arranged for slight spacing from end portion 20 of tapered jet spray guide member 21 during a molding cycle for parting a jet stream inlet into workpiece forming cavity 11 through jet port 25. Jet port 25 is connected through a water passage 26, for instance a conduit, to an impact liquid pressure generating means 27, for instance of the type disclosed in U.S. Pat. Nos. 3,575,025, 3,681,959, or 3,494,160.

The surface of expanded diameter portion 18 of tapered jet spray guide member 21 about which die segments 13, 13' interlock during a molding cycle, may be provided with a packing thereover for thereby insuring a fluid tight seal along the interlocking area. The device may be provided with an air vent 28, for instance in the tapered jet spray guide member 21 thereof.

While discrete means may be provided for actuating cylinders 15, 15' and 23, preferably said cylinders are connected to a common fluid pressure generating means 30 for synchronously controlling the disposition of said cylinders. The interlocking relationship between die segments 13 and 13' and among said die segments and tapered jet spray guide member 21 may thereby be easily controlled.

Figure 4:
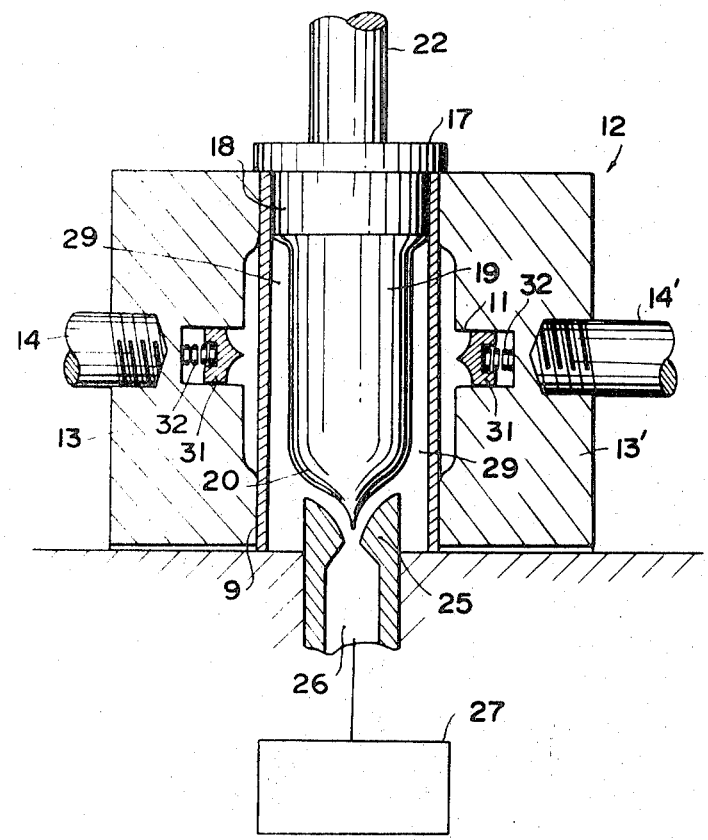
FIG. 4 is a sectional side elevational view of an embodiment of the device which includes a boring tool mounted in the mold section thereof.

As best seen in FIG. 4, die segments 13 and 13' may be provided with an interior recess for receiving a spring biased bore member 31 therein. Bore member 31 may be slidably mounted in the recess on a spring laterally mounted therein, or for example on a flexible biased material such as rubber, or resilient plastic material such as vinyl or nylon. Bore member 31 may be employed to bore, crease or provide an overhang in the workpiece 9 to be worked.

Figure 3:
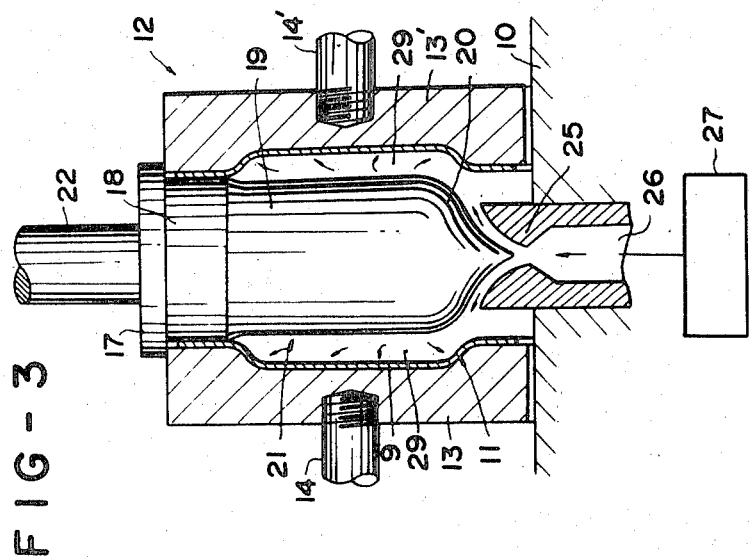
FIG. 3 is a sectional side elevational view of the embodiment of the device shown in FIG. 2 in a condition of operation after deformation of the workpiece.
Figure 2:
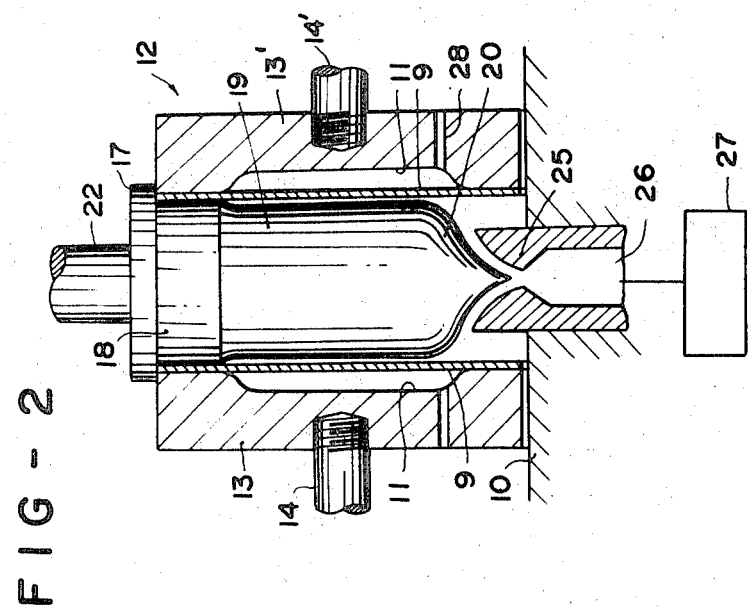
FIG. 2 is a sectional side elevational view of the embodiment shown in FIG. 1 in a condition of operation prior to deformation of the workpiece.

The mode of operation of the device is best seen by reference to FIGS. 2 and 3. A workpiece, for instance a thin plate cylinder 9 is arranged in upstanding position on base 10 in substantially concentric relation with mold 11. Piston rods 14, 14' and 22 are actuated by respective air cylinders to fixedly position workpiece 9 in mold 12. During a molding cycle, tapered jet spray guide member 21 is introduced into mold 12 and expanded diameter portion 18 thereof engages the interior surface of workpiece 9 and fixedly positions workpiece 9 against sidearms of die segments 13, 13'. Flange portion 17 of tapered jet spray guide member 21 engages the exterior top surface of die segments 13, 13' for thereby sealing the top end of mold 12. When the mold is closed and the workpiece therein suitably positioned, water is inlet to water passage 26 and jet port 25 from a suitable source (not shown) until water slightly overflows from jet port 25 into workpiece forming cavity 11, and then, as best seen in FIG. 3, impact liquid pressure generating means 27 is actuated to pressurize the liquid and thereby convert the liquid in water passage 26 into a high speed water jet propelled into workpiece forming cavity 11 from jet port 25. The water jet is directed at the pointed end portion of tapered jet spray guide member 21 and is deflected thereby along passage 29 between workpiece 9 and extended, diametrically contracted portion 19 of member 21. The impinging force of the jet stream deflected by tapered jet spray guide member 21 against workpiece 9 thereby configures the workpiece to the contour of cavity 11 of mold 12.

If it is desirable to bore or crease workpiece 9, then retractable bore member 31 may be mounted in mold 12 as best seen in FIG. 4. As workpiece 9 is configured, the boring end of member 31 may be mounted as shown for boring workpiece 9 whereby workpiece 9 is forcedly expanded outwardly in conformity with the shape of bore member 31 and thus boring and/or beetling may be accomplished simultaneously in the course of configuring the workpiece.

This invention provides a jet molding device of simple construction and easy operation whereby a workpiece may be configured under jet pressure. The device is particularly suited for configuring a relatively thin workpiece or a workpiece with a substantially low yielding point or for configuring a workpiece which it is also desired to bore, crease or beetle. While the invention has been shown and described in connection with a cylindrical workpiece, it should be understood that the configuration of die segments 13, 13' and the workpiece forming cavity 11 formed thereby may be altered to receive and work workpieces of other configurations.

It will thus be seen that the objects and advantages set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A molding device for jet-forming a workpiece comprising a mold having a workpiece forming cavity, said mold comprising a plurality of discrete die segments radially adjustable about a common axis, means for radially adjusting said plurality of discrete die segments, an axially displaceable tapered jet spray guide member coaxially arranged with said plurality of discrete die segments and positionable within said mold for sealing an end thereof, said jet spray guide member being introduceable into said workpiece forming cavity for deflecting a jet stream against a workpiece for thereby deforming said workpiece to the contour of said workpiece forming cavity, a jet port communicating with said workpiece forming cavity for introducing a jet stream therein for deforming said workpiece, said jet spray guide member and jet port being coaxially arranged, said jet port having a configuration substantially complementary to said taper of said jet spray guide member, means for sealing another end of said mold, means for axially displacing said tapered jet spray guide member and means for applying an impact pressure on liquid introduced into said jet port.

2. The molding device of claim 1, wherein said tapered jet spray guide member comprises a flange portion for sealing said end of said mold, an expanded diameter portion connected to said flange portion for positioning said workpiece in said workpiece forming cavity, an extended diametrically contracted portion connected to said expanded diameter portion and spaced from said workpiece to form a liquid jet passage therebetween and an end portion connected to said extended, diametrically contracted portion, said end portion having an end point and taper for parting a liquid jet introduced into said workpiece forming cavity through said jet port.

3. The molding device of claim 1, said means for radially adjusting said plurality of discrete die segments and said means for axially displacing said tapered jet spray guide member being synchronously actuable.

4. The molding device of claim 1, including a common means for applying pressure on said means for radially adjusting said plurality of discrete die segments and said means for axially displacing said tapered jet spray guide member, said means, respectively, comprising piston rods connected to said discrete die segments and said tapered jet spray guide member, piston heads mounted on said piston rods and cylinders for slidably mounting said piston heads therein.

5. The molding device of claim 1, including a spring biased bore member mounted on the forming surface of a discrete die segment for boring or creasing a configured workpiece, and a recess provided on the forming surface of said discrete die segment for receiving said spring biased bore member.

* * * * *